United States Patent [19]

Howes

[11] 3,896,883
[45] July 29, 1975

[54] CULTIVATOR TOOTH ASSEMBLY
[75] Inventor: John N. Howes, Alton, Ill.
[73] Assignee: Varlen Corporation, East Alton, Ill.
[22] Filed: Sept. 30, 1974
[21] Appl. No.: 510,767

Related U.S. Application Data
[63] Continuation of Ser. No. 323,309, Jan. 12, 1973, abandoned.

[52] U.S. Cl. .................................. 172/707; 172/643
[51] Int. Cl. ............................................. A01b 23/02
[58] Field of Search..... 172/142, 389, 643, 705–708

[56] References Cited
UNITED STATES PATENTS
2,806,336   9/1957   Anderson............................. 172/708
3,380,786   4/1968   Petersen ......................... 172/708 X
3,618,675   11/1971   Hornung............................. 172/707

FOREIGN PATENTS OR APPLICATIONS
40,757      7/1968   Finland............................... 172/142
383,007     2/1908   France................................. 172/708
1,360,746   4/1964   France................................. 172/142
1,757,146   2/1971   Germany............................. 172/707
957,766     5/1964   United Kingdom................. 172/708
1,120,731   7/1968   United Kingdom................. 172/707

Primary Examiner—Edgar S. Burr
Assistant Examiner—Paul T. Sewell
Attorney, Agent, or Firm—Hume, Clement, Brinks, Willian, Olds & Cook, Ltd.

[57] ABSTRACT

A cultivator spring tooth assembly including a multiple radii, single strip spring tooth of uniform cross section with a stiffening radius section between the working section and the spring section.

1 Claim, 4 Drawing Figures

PATENTED JUL 29 1975    3,896,883

CULTIVATOR TOOTH ASSEMBLY

This invention relates in general to earth-working equipment and, more particularly, to agricultural field cultivators. It deals specifically with a cultivator spring tooth assembly for soil preparation.

This application is a continuation of Application Ser. No. 323,309, filed Jan. 12, 1973, and now abandoned.

BACKGROUND OF THE INVENTION

Spring teeth for cultivators have been well-known in farm equipment and farming circles for many years. Many patents have been issued on spring tooth constructions. The Wickham U.S. Pat. No. 822,795 issued June 5, 1906, the Miller U.S. Pat. No. 1,766,396 issued June 24, 1930, and the Andersen U.S. Pat. No. 3,225,840 issued Dec. 28, 1965 and the Hornung U.S. Pat. No. 3,618,675 issued Nov. 9, 1971, are examples of these.

The spring teeth presently in use produce excellent results under ideal working conditions but leave something to be desired when cultivator speed is increased over 5 miles per hour, for example, or working depth is increased to more than 6 inches. With the development of new and larger farm equipment capable of working at these speeds, with the necessary power for deep earth penetration, known spring tooth assemblies come up short.

SUMMARY OF THE INVENTION

A primary object of the invention is to provide a new and improved cultivator spring tooth assembly. Another object is to provide a cultivator spring tooth assembly which operates effectively at relatively high speeds. Still another object is to provide a cultivator spring tooth assembly which operates effectively at relatively great earth-working depths. A further object is to provide a cultivator spring tooth assembly which provides positive trash clearance under high loads and relatively bad working conditions. Still a further object is to provide a cultivator spring tooth assembly which is effective in resisting side draft displacement. yet another object is to provide a cultivator spring tooth assembly which has a longer service life. Another object is to provide a cultivator spring tooth assembly which is easily mounted, dismounted and adjusted laterally on a tool bar.

The foregoing and other objects are realized in accord with the invention by providing a spring tooth assembly for an agricultural cultivator comprised of a multiple radii, single strip member spring tooth of substantially uniform cross-section which is clamped at its attachment end to a tool bar with a simple inverted L-clamp sub-assembly, and which terminates at its lower end in a working tip. The spring strip member is clamped to the flat lower surface of the tool bar and extends rearwardly from its trailing surface. First and second working radii sections are defined by the spring strip as it curves forwardly over the upper surface of the bar and downwardly in front of its leading surface, back under the tool bar's lower surface.

The first and second radii sections are relatively large, at least 4 13/36 inches and 5 inches, respectively. Under the tool bar the second radius section curves upwardly to the point where it is inclined 4° plus or minus 2° (4° ± 2°) to the horizontal. Upon reaching this inclination, the strip member curves sharply downwardly through a strengthening or stiffening radius section substantially in vertical alignment with the trailing surface of the tool bar.

From the strengthening or stiffening radius section of the spring strip member, the member curves downwardly in a third working radius section. This third working radius section radius is at least 6 inches. The third working radius section continues downwardly and then forwardly to the tip sub-assembly. The digging tip of the tip sub-assembly terminates at a point slightly behind the trailing surface of the tool bar.

BRIEF DESCRIPTION OF THE DRAWINGS

The invention, together with additional objects and advantages thereof, is best understood by reference to the following description, read in conjunction with the accompanying drawings, in which.

DESCRIPTION OF THE PREFERRED EMBODIMENT

Figure 1:
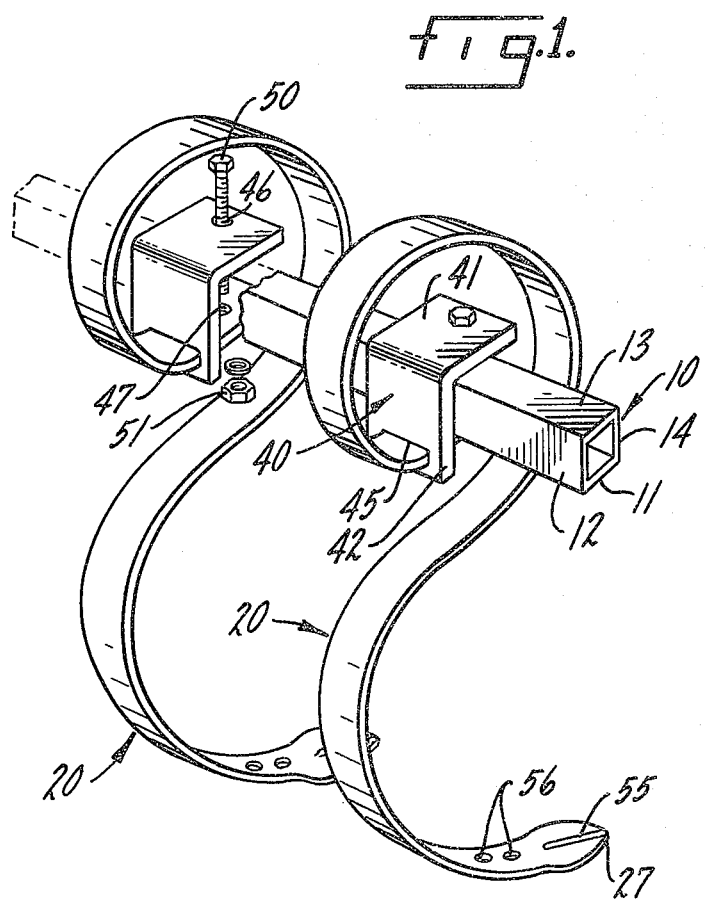
FIG. 1 is a perspective view of a pair of spring tooth assemblies constructed and arranged on the tool bar of a cultivator rig according to features of the present invention.
Figure 2:
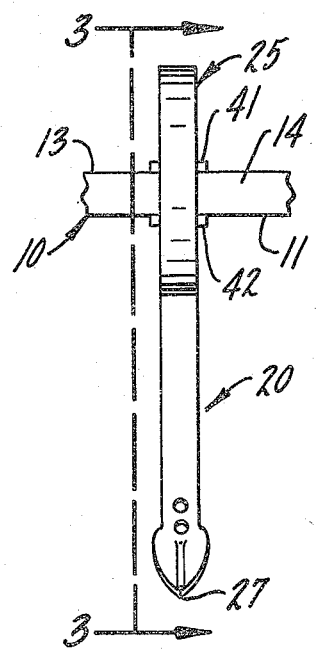
FIG. 2 is a front elevational view of one of the culivator spring tooth assemblies seen in FIG. 1.
Figure 4:
FIG. 4 is a view taken along line 4—4 of FIG. 3.
Figure 3:
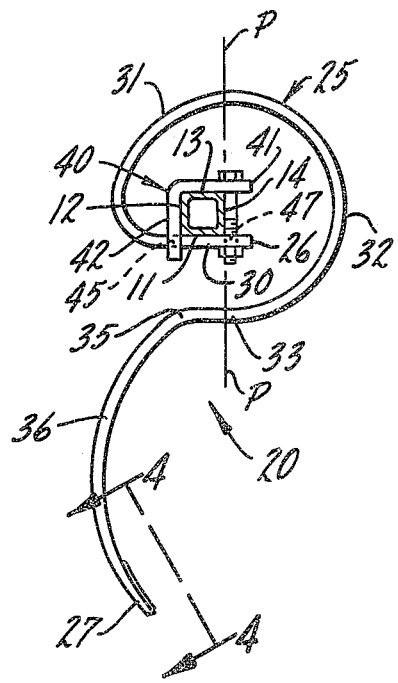
FIG. 3 is a sectional view taken along line 3—3 of FIG. 2.

Referring now to the drawing, and particularly to FIG. 1, the tool bar of an agricultural earth cultivator rig (not shown) is illustrated generally at 10. The bar 10, which is square in cross-section and includes a lower horizontal surface 11, a trailing vertical surface 12, and upper horizontal surface 13, and a leading vertical surface 14, mounts two identical cultivator spring tooth assemblies 20 constructed and arranged according to features of the present invention. The cultivator spring assembly 20 on the left in FIG. 1 is shown being mounted on the tool bar 10, while the assembly 20 on the right is shown mounted and ready for operation.

Considering all of the drawing figures now, it will be seen that each cultivator spring tooth assembly 20 comprises a curved, multi-radius strip member 25 attached to the bar at its upper free end 26 and terminating at its lower free end 27. The strip member 25 having a substantially uniform cross section is formed in a single piece from spring steel by conventional forming techniques.

The spring strip member 25, adjacent its free end 26, is formed into a horizontal, planar attachment section 30 which is adapted to seat flush against the horizontal lower surface 11 of the bar 10 with the free end 26 protruding in front of the bar's leading surface 14. The attachment section 30 extends rearwardly of the bar trailing surface for approximately 3 ⅞ inches, where it joins (unitarily) the first working radius section 31, curving upwardly rearwardly and then upwardly and forwardly toward the plane P of the leading surface 14 of the tool bar 10 in a radius of at least 4 13/16 inches over the bulk of its length.

Upon reaching the plane P at a point above the tool bar 10, the first working section 31 joins the second working radius section 32 which curves downwardly and forwardly and then downwardly and rearwardly in a radius of at least 5 inches until it reaches the generally horizontal section 33 in the strip member 25 disposed immediately below the tool bar 10 and bisected by the plane P.

This generally horizontal section 33 of the strip member 25 actually curves upwardly until it is inclined upwardly at an angle of 4° plus or minus 2° (4° ± 2°). This point of upwardmost curvature occurs immediately under the tool bar 10, approximately at its mid-point. Here the strip member curves downwardly in a sharp radius of approximately four inches through a stiffening or strengthening radius section 35. The stiffening or strengthening radius section 35 is in substantial vertical alignment with the trailing surface 12 of the tool bar 10.

The section 35 unitarily joins a third working radius section 36 of the strip member 25. The third working radius section 36 extends downwardly rearwardly and then downwardly forwardly through the vertical to terminate in the tip 27. The radius of the third working radius section 36 is approximately 6 ¼ inches.

The strip member 25 is attached to the tool bar 10 at its attachment section 30, as has been pointed out. It is attached to the tool bar 10 by means of attachment sub-assembly including an inverted L-shaped clamp 40 having a horizontal leg 41 adapted to overlie the upper surface 13 of the bar 10 and protrude forwardly of its leading surface 14, and a depending leg 42 which is adapted to seat against the trailing surface 12 of the bar and protrude below its horizontal lower surface 11.

A horizontal slot 45 of length and width just sufficient to pass the strip member 35 attachment end 30 is formed in the lower end of the leg 42, substantially level with the lower surface 11 of the bar 10 once the clamp 40 is properly seated on the bar 10. Corresponding bolt holes 46 and 47 are formed downwardly through the protruding front end of the clamp leg 41 and the correspondingly protruding front end 26 of the strip member attachment section 30, substantially in alignment with the leading surface 14 of the bar 10.

As seen in the left spring cultivator assembly 20 in FIG. 1, to properly mount the strip member 25 the attachment section 30 is slipped through the slot 45 and the assembly positioned as illustrated. A bolt 50 is then passed down through the bolt holes 46 and 47 and a nut (with washer) 51 threaded onto the bolt. When the nut 51 is tightened, it draws the clamp 40 and strip member 25 tightly against the tool bar 10. By reversing this procedure, the strip member 25 obviously can be removed and adjusted laterally of the bar 10, or replaced.

In operation, the tip 27 of the spring tooth assembly 25 digs into the earth substantially behind the plane P of the leading edge of the tool bar. In this light, note that the tip 27 has a conventional rib 55 forged thereon, and holes 56 for reversible point shovel mounting. The position and attitude of the tip 27 as it breaks up the earth assures good balance in the cultivator rig itself and avoids twisting of the rig even when ground conditions are quite bad, such as when the ground is extremely hard, for example.

The generally horizontal radius section 33 of the strip member 25, having an upward inclination of 4° plus or minus 2° (4° ± 2°) provides excellent trash clearance.

When the tooth 27 hits heavy trash, for example, the working radii sections 31 and 32 are compressed most effectively to pass the trash without damage to the spring tooth assembly 20.

The relatively sharp, short radius curve of the stiffening and straightening section 35 is effective to stiffen the lower working section 36. It does not flex as readily as the working sections 31, 32 and 36 and assists in assuring good earth penetration.

The first and second working radii 31 and 32 are sufficiently large so that even under extremely heavy load conditions they will not break or come into engagement with the tool bar 10. By virtue of these relatively large radii working sections 31 and 32, the tool assembly 20 is also easy to mount.

It will now be understood that the tool assembly strip member 25 has three working radii, giving it great flexibility. Nevertheless, its construction assures that it retains substantial strength. Good trash clearance is also afforded, preventing severe twisting stresses from being imparted to the cultivator rig.

The mounting sub-assembly prevents side draft twisting of the tooth's strip member 25. Furthermore, it permits simple and fast mounting, dismounting or lateral adjustment of the tooth assembly 20 on the mounting bar 10.

While the embodiment described herein is at present considered to be preferred, it is understood that various modifications and improvements may be made therein.

What is desired to be claimed and secured by Letters Patent of the United States is:

1. A spring tooth assembly for mounting on the tool bar of an agricultural cultivator or the like, comprising:
   a. a flexibly resilient strip member formed substantially of a single piece of spring steel in a flat, substantially uniform cross-section from an upper end attachment section to a lower end tip,
   b. said attachment section adapted to be clamped to a tool bar and extend rearwardly thereof,
   c. said strip member including a first working section curved upwardly and rearwardly and then upwardly and forwardly from said attachment section, around and over the tool bar, said first working section then extending downwardly and rearwardly around and under the tool bar until it has passed the horizontal and is inclined at least slightly upwardly,
   d. said strip member then being bent sharply downwardly at a point substantially in vertical alignment with the trailing surface of the tool bar into a section of the strip member which provides a stiffening of the resilient strip member in this area,
   e. said strip member further including a second working section curved downwardly and rearwardly from said stiffening section and then downwardly and forwardly to said tip,
   f. said tip terminating in substantial alignment with or only slightly behind the trailing surface of said tool bar.

\* \* \* \* \*

UNITED STATES PATENT OFFICE
CERTIFICATE OF CORRECTION

Patent No. 3,896,883          Dated July 29, 1975

Inventor(s) JOHN N. HOWES

It is certified that error appears in the above-identified patent and that said Letters Patent are hereby corrected as shown below:

Column 1, line 63, "4 13/36" should be --4 13/16--.

*Signed and Sealed this*

*seventeenth* Day of *February 1976*

[SEAL]

*Attest:*

RUTH C. MASON
*Attesting Officer*

C. MARSHALL DANN
*Commissioner of Patents and Trademarks*